United States Patent [19]
Pope et al.

[11] 4,216,943
[45] Aug. 12, 1980

[54] VERSATILE STANDOFF INSULATOR AND CHARGED FENCE ARRAY FOR MOUNTING ON CHAIN LINK FENCES AND ELSEWHERE

[75] Inventors: George F. Pope; Evelyn O. Childress, both of Burlington, N.C.

[73] Assignee: Diversified Manufacturing & Marketing Co., Inc., Burlington, N.C.

[21] Appl. No.: 902,527

[22] Filed: May 3, 1978

[51] Int. Cl.$^{3}$ .................. A01K 3/00; H01B 17/16; H01B 17/24

[52] U.S. Cl. .................. 256/10; 24/81 CC; 174/163 F; 174/166 R

[58] Field of Search .......... 174/33, 154, 155, 158 R, 174/158 F, 160, 161 F, 163 R, 163 F, 164, 166 R, 156, 157, 170; 256/10; 340/564; 24/73 CC, 81 CC; 248/226.3; 403/391

[56] References Cited

U.S. PATENT DOCUMENTS

| | | | |
|---|---|---|---|
| 402,810 | 5/1889 | Denver | 174/33 |
| 440,042 | 11/1890 | Kessler | 174/157 |
| 955,065 | 4/1910 | Hardin | 174/157 X |
| 2,422,012 | 6/1947 | Greenlee | 256/10 |
| 2,424,677 | 7/1947 | Brownlee | 340/564 |
| 2,856,159 | 10/1958 | Braddock | 174/158 F X |

FOREIGN PATENT DOCUMENTS

| | | | |
|---|---|---|---|
| K 15798 | 5/1956 | Fed. Rep. of Germany | 174/164 |
| 1196007 | 7/1965 | Fed. Rep. of Germany | 174/163 F |

*Primary Examiner*—Laramie E. Askin
*Attorney, Agent, or Firm*—Michael F. Petock

[57] ABSTRACT

A versatile standoff insulator for mounting on chain link fences and elsewhere is comprised of first and second shaped insulating members having grooves or passageways between the insulating members for mounting to the links of the fence or other object. The same structure may be mounted directly onto surfaces by conventional fastening means such as nails and screws. The standoff element is provided with a grommet to prevent the wire from wearing and breaking at the suspension points.

6 Claims, 6 Drawing Figures

VERSATILE STANDOFF INSULATOR AND CHARGED FENCE ARRAY FOR MOUNTING ON CHAIN LINK FENCES AND ELSEWHERE

BACKGROUND OF THE INVENTION

The present invention is directed to a versatile standoff insulator for mounting on chain link fences and elsewhere.

In the past, there has been no known suitable standoff insulating means for the mounting of wires, such as electrically charged fence wires, to fences of the type commonly known as chain link fences. Chain link fence is a mesh of wire links, commonly made of galvanized steel, aluminum or vinyl coated.

SUMMARY OF THE PRESENT INVENTION

The present invention is directed to a versatile standoff insulator for mounting on chain link fences and surfaces of all types. The present invention may be economically manufactured and may be securely mounted to chain link fences and other similar types of structures. In addition, the same structural mounting means of the standoff insulator of the present invention may be mounted to surfaces, such as wood, masonry, metal or any other suitable surface. When mounting to a flat surface, as contrasted to a chain link fence, it may be desirable to reverse the insulator elements, especially where the surface may be conductive or rigid and smooth.

The present invention is directed to a standoff insulator which may be adapted for mounting on wire fencing, such as chain link fence, and is particularly adapted for use in holding a charged fence wire as is commonly used for security. The standoff insulator is comprised of a first insulator block and a second insulator block. The first and second insulator blocks are mountable together by fastening means with the first and second blocks being shaped to form a first and second substantially parallel groove, recess or slot a pre-determined distance apart from each other along the junction of the two insulator blocks. A means is provided for fastening a standoff rod to at least one of the insulator blocks.

The present invention is economical to manufacture, and in a preferred embodiment, both insulator blocks may be formed to the identical shape. Each of the blocks would then have a slot, groove or recess formed in one of the surfaces a predetermined distance from the center. By placing the slots on opposite sides of the center, a pair of parallel slots or grooves are formed in the insulator mounting blocks. The two blocks are mounted together by any suitable fastening means, such as threaded fastening means in the form of nuts and bolts. This arrangement also produces slots which are slightly vertically off center thereby enabling slight adjustment in the positioning of the direction of the standoff rod with respect to the fence. This is particularly helpful in the case where the links of the chain link fence may not be exactly vertically arranged, that is some of the links slightly extending outward in one direction with respect to the fence and other of the links extending slightly inward with respect to the plane of the fence.

In another embodiment of the present invention, slots or grooves may be formed in only one of the two insulator blocks. Additionally, the standoff rod may be provided with a grommet, preferably made of a material such as nylon, to help reduce the wear and breakage of the wire supported by the standoff insulator.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
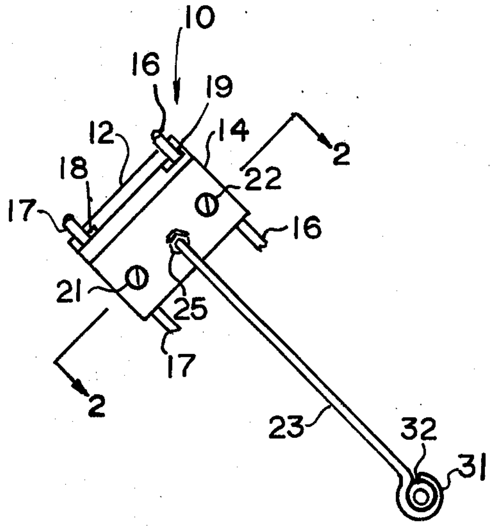
FIG. 1 is a view in perspective of a standoff insulator in accordance with the present invention as mounted on a chain link fence.
Figure 2:
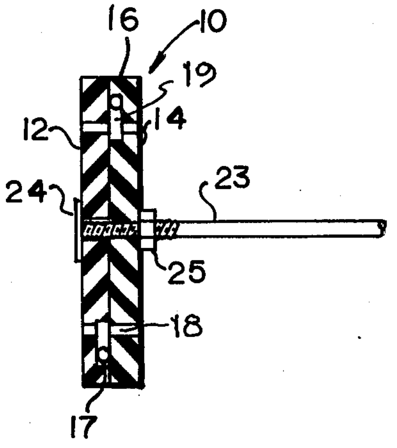
FIG. 2 is a cross-sectional view taken along line 2—2 of FIG. 1.

Referring now to the drawings, wherein like numerals indicate like elements, there is shown in FIGS. 1 and 2 a standoff insulator 10 in accordance with the present invention which is comprised of a first insulator block 12 and a second insulator block 14. The standoff insulator 10 is shown mounted on links 16 and 17 of a chain link fence. The chain link fence is not shown, but may be of conventional diamond shape or slanted square pattern construction as is conventional.

As shown in FIGS. 1 and 2, insulator block 12 is provided with a groove, recess or slot 18 and insulator block 14 is provided with a groove, recess or slot 19. Insulator blocks 12 and 14 are placed over the links 16 and 17, with links 16 and 17 being in slots 19 and 18, respectively, and are mounted together by means of fasteners such as screws or bolts 21 and 22.

Figure 5:
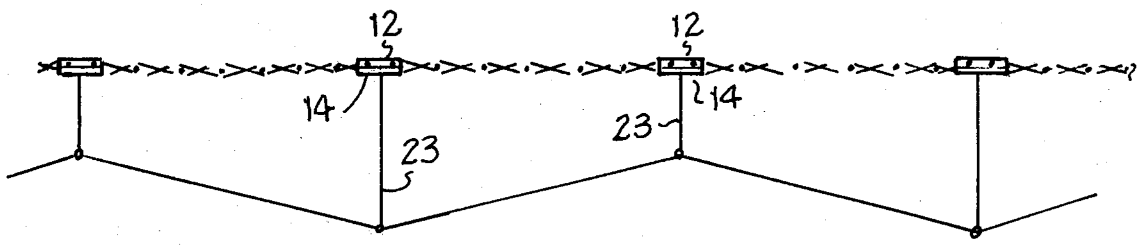
FIG. 5 is a plan view of an arrangement of an electrical array mounted to a chain link fence utilizing standoff insulators of different lengths in accordance with the present invention.
Figure 6:
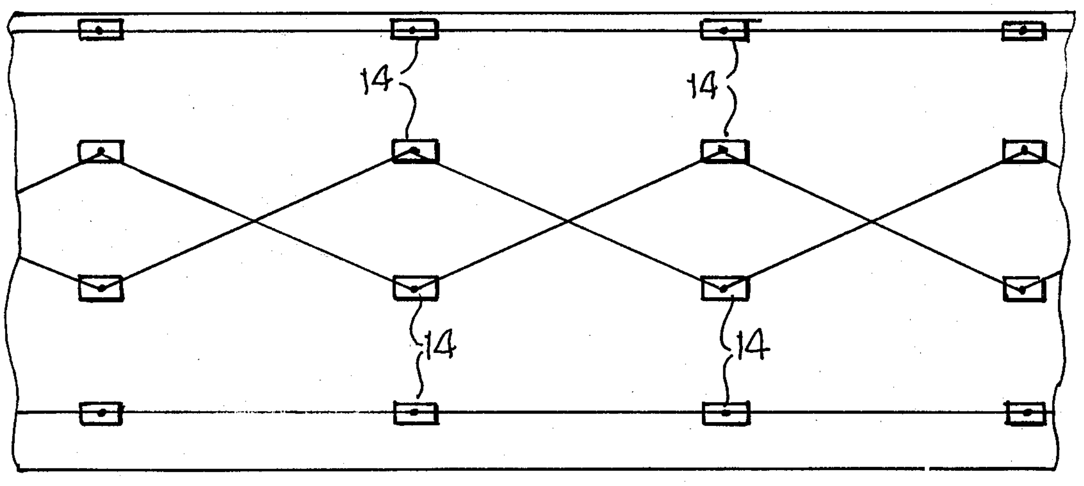
FIG. 6 is an elevation view of a fence having four arrangements of standoff insulators as shown in FIG. 5 with the two central arrangements being arranged in a weaving pattern in accordance with the present invention.

Standoff rod 23 is mounted to the insulator blocks by an internally threaded nut structure 24 mounted to extend into the center hole of insulator block 12. Rod 23 is locked with respect to rotation by means of nut 25 which is tightened against insulator block 14. It is understood that fasteners or fastening bolts 21 and 22 are not necessary, and that the blocks may be held together by a threaded portion of rod 23 which is in threaded engagement with internally threaded nut 24 and locking nut 25. If desired, this would be sufficient to mount the insulator blocks 12 and 14 to a chain link fence. Therefore, bolts 21 and 22 are not shown in FIG. 2. The standoff insulator as mounted on a fence may be of short or long lengths, for example, six or twelve inch lengths, with alternately short and long lengths mounted to the fence to produce a weaving pattern of the charged wire to prevent a person from going over or under the charged wire. (See FIGS. 5 and 6).

The mounting of standoff insulator 10 to a chain link fence by the use of the threaded portion of standoff rod 23 is a preferred embodiment. Once the standoff insulator is mounted to the chain link fence and the charged line of a security fence is run through grommet 32 of wire holding end 31 of standoff rod 23, the standoff insulator 10 cannot be removed from the fence as standoff rod 23 cannot be rotated unless the wire is cut. The cutting of the wire would set off an alarm if the apparatus of applicants' co-pending application entitled "ELECTRIC FENCE MONITOR AND ALARM APPARATUS AND METHOD" Ser. No. 902,526, filed May 3, 1978 were in use with the charged security fence wire. Grommet or bushing 32 is provided to prevent wear of the wire passing through it thereby reducing the possibility of breakage after a period of time. Grommet 32 may be preferably made of nylon, but any other suitable non-abrasive composition may be used to form the grommet 32.

Figure 3:
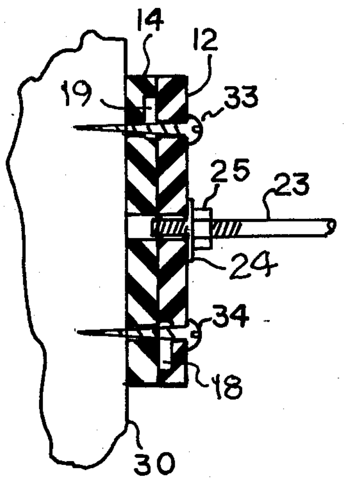
FIG. 3 is a side elevation view partially in section of a standoff insulator in accordance with the present invention as mounted to a substantially flat surface.

Referring now to FIG. 3, there is shown the standoff insulator of the present invention mounted to a flat surface 30. In FIG. 3, the insulator blocks 12 and 14 are reversed as shown so that insulator block 12 with internally threaded nut 24 is located on the outside surface towards the wire holding end 31 of standoff rod 23. Standoff rod 23 is locked with respect to internally threaded nut 24 by means of locking nut 25. The insulator blocks 12 and 14 are mounted to surface 30 by suitable fastening means such as wood screws 33 and 34. However, it is understood that any other suitable fastening means such as nails and bolts may be used.

Figure 4:
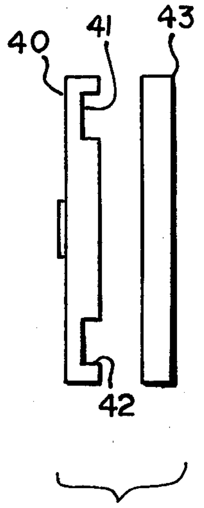
FIG. 4 is a partial side elevation view showing another embodiment of the present invention.

Referring now to FIG. 4, there is shown another embodiment of the present invention in which a first insulator block 40 is provided with two grooves, slots or recesses 41 and 42 formed a predetermined distance apart. Insulator block 43 does not include any slots. In this embodiment, the two insulator blocks are different, but only one of the blocks has to have grooves formed in it. For example in a case where the insulator blocks are formed from large sheets, block 43 may be formed by merely cutting the insulator block to size. Block 40 would then be machined with two grooves. However, it is understood that the grooves or slots may be formed by any suitable process, including but not limited to molding and extruding. It is obvious, that other similar variations to the present invention may be made within the scope and spirit of the present invention.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A standoff insulator for a charged fence wire or the like adaptable for mounting on chain link fences or the like and other surfaces, comprising: a first insulator block and a second insulator block, said first and second insulator blocks being mountable together by a fastening means, said first and second blocks being shaped to form first and second substantially parallel recesses a pre-determined distance apart along a junction formed by the two insulator blocks, said first and second substantially parallel recesses being adapted for mounting the two insulator blocks upon the links of a chain link fence, said first and second blocks also being provided with mounting holes whereby said blocks may alternatively be fastened to other surfaces, at least one of said blocks being provided with thread means substantially centrally located between said substantially parallel recesses, and a standoff rod fastenable to at least one of said insulator blocks and being providable with means to apply a retaining force against the other of said insulator blocks.

2. A standoff insulator in accordance with claim 1 wherein said recesses are formed by a single groove or slot in each insulator block.

3. A standoff insulator in accordance with claim 1 wherein said substantially parallel recesses are formed by two substantially parallel grooves in one of said first and second blocks.

4. A standoff insulator in accordance with claim 1 wherein said standoff rod is provided with a grommet to reduce wear of a suspended wire.

5. An arrangement for forming an electrically charged array mounted on a fence, comprising:

first standoff insulators of a first pre-determined length, said first standoff insulators each having a mounting end and means for carrying an electrically charged wire on its opposite end;

second standoff insulators of a second pre-determined length which is shorter than the length of said first standoff insulators, said second standoff insulators each having a mounting end and means for carrying an electrically charged wire on its opposite end; and insulators of said first length and said second length being sequentially alternately mounted to a fence and carrying an electrically charged wire through the means on each of said standoff insulators for carrying said charged wire.

6. An arrangement in accordance with claim 5 including a second arrangement as set forth in claim 5 wherein said first and second arrangements are mounted to form a weaving pattern in the charged wire wherein the standoff insulators of said first length of said first arrangement are mounted substantially vertically offset from standoff insulators of said second length of said second arrangement, and the standoff insulators of said second length of said first arrangement being mounted substantially vertically offset from stand-off insulators of said first length of said second arrangement, thereby resulting in the wire running through said first arrangement and the wire running through said second arrangement being arranged in a weaving pattern in which the spacing of each wire from the fence varies.

* * * * *